United States Patent
Wang et al.

(10) Patent No.: US 11,606,670 B2
(45) Date of Patent: Mar. 14, 2023

(54) METHODS AND APPARATUS FOR PROPAGATING DATA IN A WIRELESS CELLULAR NETWORK

(71) Applicant: Telefonaktiebolaget LM Ericsson (publ), Stockholm (SE)

(72) Inventors: Keven Wang, Sollentuna (SE); Elena Fersman, Stockholm (SE); Rafia Inam, Västerås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 737 days.

(21) Appl. No.: 16/332,662

(22) PCT Filed: Sep. 13, 2016

(86) PCT No.: PCT/EP2016/071572
§ 371 (c)(1),
(2) Date: Mar. 12, 2019

(87) PCT Pub. No.: WO2018/050210
PCT Pub. Date: Mar. 22, 2018

(65) Prior Publication Data
US 2021/0289324 A1    Sep. 16, 2021

(51) Int. Cl.
*H04W 4/06* (2009.01)
*H04W 4/38* (2018.01)
*H04W 8/28* (2009.01)

(52) U.S. Cl.
CPC .............. *H04W 4/06* (2013.01); *H04W 4/38* (2018.02); *H04W 8/28* (2013.01)

(58) Field of Classification Search
CPC ............. H04L 65/4076; H04L 65/4084; H04L 12/1836; H04L 12/18; H04L 12/185; H04W 4/06; H04W 4/38; H04W 4/08; H04W 76/40; H04W 8/28
See application file for complete search history.

(56) References Cited

U.S. PATENT DOCUMENTS

| 2007/0270159 A1 | 11/2007 | Lohtia et al. |
| 2010/0165902 A1* | 7/2010 | Kvernvik ............... H04W 4/06 370/312 |
| 2014/0057645 A1 | 2/2014 | Chowdhary et al. |

(Continued)

FOREIGN PATENT DOCUMENTS

EP    2 618 596 A1    7/2013

OTHER PUBLICATIONS

International Search Report and Written Opinion issued in International Application No. PCT/EP2016/071572, dated Jan. 19, 2017, 13 pages.

*Primary Examiner* — Margaret G Mastrodonato
(74) *Attorney, Agent, or Firm* — Rothwell, Figg, Ernst & Manbeck, P.C.

(57) ABSTRACT

Methods and apparatus are disclosed for the propagation of data over a network. Data packets are transmitted with identifiers (e.g. multicast addresses) for devices or groups of devices which are to receive the data. The data packets are further transmitted with propagation indicators, indicating the cells over which the data is to be propagated (or how widely the data is to be propagated from its source). Thus only those devices 10 which are both addressed by the data packets and within the cells identified by the propagation indicator receive the data.

22 Claims, 6 Drawing Sheets

(56) References Cited

U.S. PATENT DOCUMENTS

2014/0064177 A1 3/2014 Anchan
2016/0301725 A1* 10/2016 Bouazizi ............ H04N 21/8586
2017/0171071 A1* 6/2017 Turon ................... H04W 12/10

* cited by examiner

METHODS AND APPARATUS FOR PROPAGATING DATA IN A WIRELESS CELLULAR NETWORK

CROSS REFERENCE TO RELATED APPLICATION(S)

This application is a 35 U.S.C. § 371 National Stage of International Patent Application No. PCT/EP2016/071572, filed Sep. 13, 2016, designating the United States.

TECHNICAL FIELD

The present disclosure relates to methods and apparatus for propagating data in a wireless cellular network including, for example, data acquired from a plurality of sensors.

BACKGROUND

Efforts are on-going to define and implement new telecommunications standards that are expected to meet the criteria for $5^{th}$ generation mobile networks (5G) as defined by the Next Generation Mobile Networks Alliance. One of the expectations for a 5G network is that it will have to provide connectivity for numbers of devices that are orders of magnitude greater than current networks. For example, one anticipated use case is the provision of massive sensor networks (e.g. including hundreds of thousands of sensors) providing information on their surroundings, their movement, their environment, etc. Such information may be used in any number of ways to improve services or make them more efficient.

Given the numbers of devices and sensors that are expected to exist in future networks, it is important that the information is propagated from the sensors (or other similar devices) that generate the data to those devices that require it, in an efficient manner to avoid overwhelming the network with traffic.

Currently, no methods are defined that enable such information to be propagated over a network.

SUMMARY

One solution to the problem above is to provide, for each group of sensors, a sensor gateway which is responsible for collecting the data locally, and pushing it to a remote server or a cloud service. A consumer then either fetches the data from the remote server or the cloud service, or receives push notifications. Using this method, a central server or cloud service is always required, which can be a bottle neck due to the massive number of producers and consumers. Further, for time-sensitive applications, storing the data in a remote server and then fetching the data may add unacceptable latency.

An alternative approach is for consumer devices to join sensor networks directly using a short-range communication protocol, e.g. Wi-Fi, Bluetooth, Zigbee, etc., and receive the data from the sensors directly. Such a solution is more scalable, as no central server is required, and has lower latency since the data is both produced and consumed locally. However, it requires consumer devices to be geographically close enough to the sensor networks to connect. Further, if the consumer devices are moving, they may have to connect and reconnect to different sensor networks in their vicinity. Not only will this waste considerable resources when establishing and re-establishing connections to the network, it makes it difficult to maintain security in the consumer device and the sensor network(s).

One aspect provides a method in a wireless device of a wireless cellular network, the wireless cellular network comprising a plurality of cells, each cell served by a radio network node. The method comprises: obtaining data to be propagated over the wireless cellular network; and transmitting, to a radio network node serving a first cell in which the wireless device is located, a wireless communication signal. The wireless communication signal comprises: the data to be propagated by the wireless cellular network; a propagation indicator, for indicating one or more cells of the wireless cellular network; and an identifier for identifying one or more wireless devices to which the data is to be propagated, responsive to a determination that a wireless device of the one or more identified wireless devices is served by one of the one or more cells.

In another aspect, there is provided a wireless device for a wireless cellular network, the wireless device comprising: processor circuitry; and a computer-readable medium coupled to the processor circuitry. The computer-readable medium stores code which, when executed by the processor circuitry, causes the wireless device to: obtain data to be propagated over the wireless cellular network; and transmit, to a radio network node serving a first cell in which the wireless device is located, a wireless communication signal. The wireless communication signal comprises: the data to be propagated by the wireless cellular network; a propagation indicator, for indicating one or more cells of the wireless cellular network; and an identifier for identifying one or more wireless devices to which the data is to be propagated, responsive to a determination that a wireless device of the one or more identified wireless devices is served by one of the one or more cells.

In a further aspect, there is provided a method in a network node of a cellular wireless network, the method comprising: responsive to receipt of a wireless communications signal transmitted by a first wireless device, the wireless communications signal comprising data to be propagated by the wireless cellular network, a propagation indicator, for indicating one or more cells of the wireless cellular network, and an identifier for identifying one or more wireless devices to which the data is to be propagated, determining which of the one or more identified wireless devices is served by the one or more cells; and initiating propagation of the data to the determined identified wireless devices.

In another aspect, there is provided a network node for a wireless cellular network, the network node comprising: processor circuitry; and a computer-readable medium coupled to the processor circuitry. The computer-readable medium stores code which, when executed by the processor circuitry, causes the network node to: responsive to receipt of a wireless communications signal transmitted by a first wireless device, the wireless communications signal comprising data to be propagated by the wireless cellular network, a propagation indicator, for indicating one or more cells of the wireless cellular network, and an identifier for identifying one or more wireless devices to which the data is to be propagated, determine which of the one or more identified wireless devices is served by the one or more cells; and initiate propagation of the data to one or more determined identified wireless devices. The network node may be a core network node, or a radio access network node, for example.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
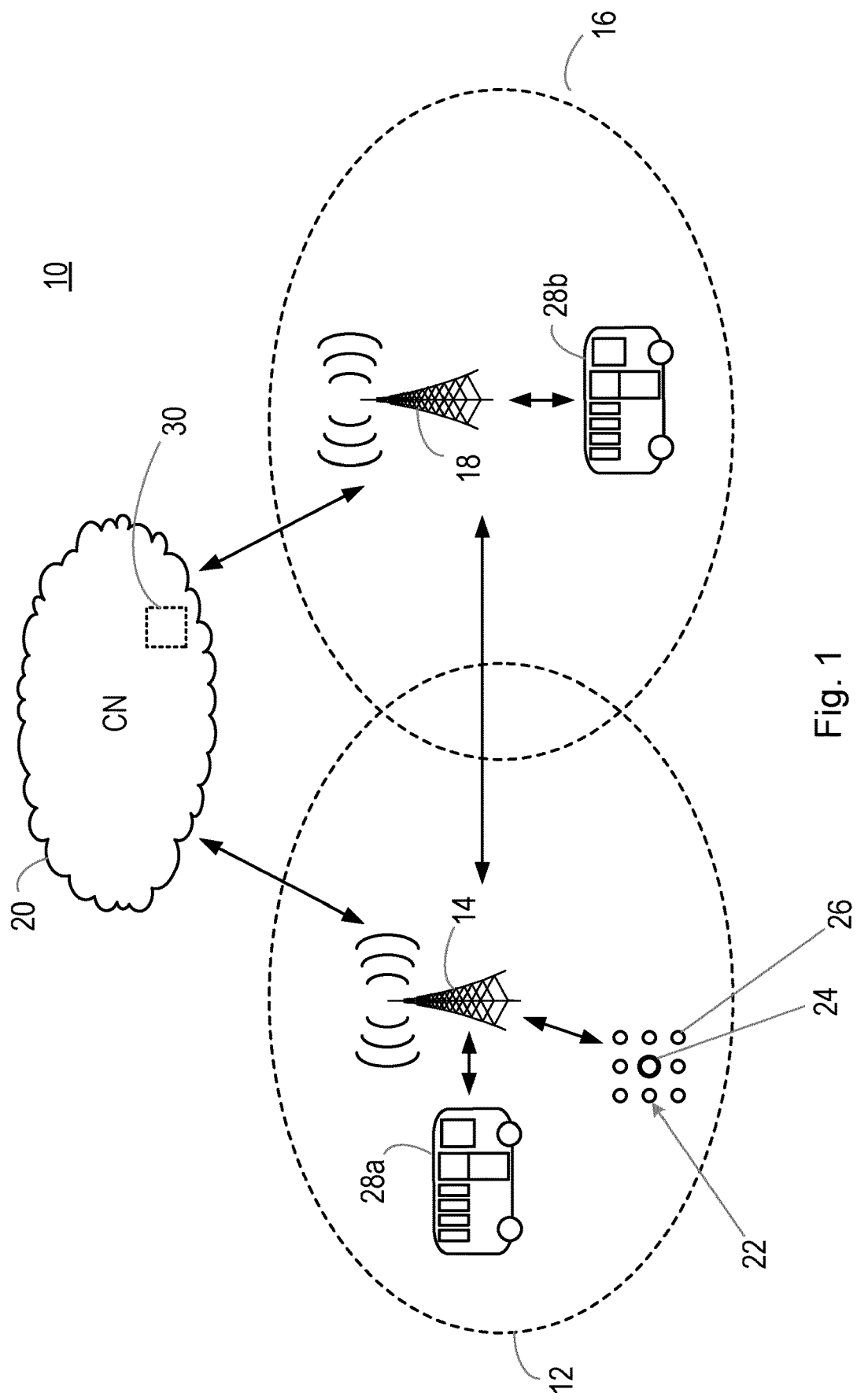
FIG. 1 is a schematic diagram showing a wireless communications network.

FIG. 1 illustrates a system according to embodiments of the disclosure, comprising a wireless cellular communications network 10, and a secondary network 22.

The cellular network 10 may at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1xRTT and High Rate Packet Data (HRPD), just to mention some options. The network 10 may be suitable for providing radio communications meeting one or more of the criteria established by the Next Generation Mobile Networks Alliance for the 5th generation of mobile telecommunications standards.

In the illustration, the cellular network 10 comprises radio access nodes 14, 18 that provide radio coverage for respective cells 12, 16. Although only two cells are shown in FIG. 1, those skilled in the art will appreciate the network 10 will in general comprise any number of radio access nodes, with each node serving one or multiple cells over different coverage areas and/or frequencies.

The radio access nodes 14, 18 may be referred to as e.g. base stations, NodeBs, evolved NodeBs (eNB, or eNodeB), base transceiver stations, Access Point Base Stations, base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

Within each cell 12, 16, wireless devices communicate with the respective radio access node 14, 18 to provide services as will be familiar to those skilled in the art. Each radio access node 14, 18 further communicates with a core network 20 in order to co-ordinate and control the network 10, and provide access to other parts of the network 10 (e.g. devices in other cells, not illustrated).

The two radio access nodes 14, 18 (and the cells 12, 16 which they serve) may be termed "neighbouring", in that they are geographically proximal and have at least some overlapping radio coverage. Neighbouring cells and radio access nodes may be discovered in an ongoing discovery process (such as automatic neighbour recognition, ANR), or defined "over the top" by an operator of the network 10.

In the illustration, the cells 12, 16 are sufficiently close to one another that a direct wireless interface is established between the radio access nodes, i.e. the radio access node 14 is able to communicate with the radio access node 18 directly, without passing through the core network. In the LTE standard, this interface is called the X2 interface. Such an interface may conventionally be used for handover of a device that moves from one cell to another.

The secondary network 22 (also called a capillary network) is a local network that uses short-range wireless technologies to provide a group of devices 26 with connectivity. For example, devices 26 in the secondary network may communicate with each other using a protocol such as WiFi, Zigbee, Bluetooth, etc.

The devices 26 may carry out any function that is deemed desirable. However, in one embodiment, the devices 26 are sensors that sense or detect a variable in their environment and thus acquire data over a period of time. For example, the sensors may be positioned in or next to roads in order to monitor traffic levels, they may be provided in a building to provide relevant information to real-estate management, they may connect goods in transit to a monitoring application, monitor weather, etc. The sensors may be positioned within a relatively small geographical area (e.g. such as a city) or over a larger geographical area (such as an oilfield). The number of potential use cases is extremely large, and the present disclosure is not limited to any particular one. In general, however, the devices 26 acquire information or data on their local surroundings (including their location).

One or more of the devices 24 in the secondary network 22 may be termed a gateway. Gateway devices 24 are able to communicate with the cellular network 10 in addition to the other devices 26 in the secondary network 22. In contrast, non-gateway devices 26 may be unable to communicate with the cellular network, and instead rely on the gateway device 24 for connectivity to that network 10. The secondary network 22 may additionally comprise one or more relay devices (not illustrated) that relay communications between the devices 26 and the gateway device 24, e.g. in case a particular device is out of the range of the gateway device.

For example, a gateway device 24 may comprise a modem or module that is configured both to generate signals according to the short-range communication protocol for transmission to the other devices 26 in the secondary network 22 (and conversely to demodulate signals received from those devices 26), and to generate signals according to the cellular network protocol for transmission to the radio access node 14 (and conversely to demodulate signals received from the radio access node 14). Alternatively, the gateway device 24 may comprise separate modems or modules for each communications protocol.

Thus, in one mode of operation, the devices 26 acquire data and communicate that data to the gateway device 24 using the short-range communication protocol. The gateway device 24 then transmits that data to the radio access node 14 (or whichever radio access node is serving the gateway device 24) using the wireless cellular communication protocol. The gateway device 24 may collate data from multiple devices 26 into a single transmission to the radio access node 14, so as to reduce the wireless resources required for the transmission of data. Alternatively, however, the gateway device 24 may transmit individual signals containing data from individual devices 26.

In the illustration, the secondary network 22 is depicted entirely within a single cell 12. However, the devices of the secondary network 22 may be spread over a wider area, including multiple cells.

The cellular network 10 further comprises consumer devices 28, which are wireless devices or terminal devices (e.g. UEs) that require or use the data acquired by the devices 26. A first consumer device 28a is located within the cell 12 and is served by the radio access node 14, while a second consumer device 28b is located in the cell 16 and is served by the radio access node 18.

It should be understood by the person skilled in the art that "UE" is a non-limiting term comprising any mobile or wireless device or node equipped with a radio interface allowing for at least one of: transmitting signals in uplink (UL), receiving and/or measuring signals in downlink (DL), and transmitting and/or receiving signals in a D2D/sidelink mode. A wireless device herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "wireless device" or "UE", the terms "mobile device" and "terminal device" may be used interchangeably in the description, and it will be appreciated that such a device does not necessarily have to be 'mobile' in the sense that it is moving. Instead, the term "mobile device" encompasses any device that is capable of communicating with communication networks that operate according to one or more mobile communication standards, such as the Global System for Mobile communications, GSM, Universal Mobile Telecommunications System (UMTS), Long-Term Evolution, LTE, etc.

Such consumer devices 28 may be mobile telephones, computers, or other conventional consumers of mobile communication data. However, it is becoming increasingly common for wireless devices to be embedded within other macro devices that have not previously been associated with mobile data. For example, wireless devices may be embedded within vehicles (e.g. cars, buses, motorbikes, etc), domestic appliances (e.g. refrigerators, televisions, etc), surgical tools, etc. In the illustrated embodiment, the consumer devices 28a and 28b are vehicles, specifically buses. However, the number of use cases is expected to grow exponentially over time, and the present disclosure is not limited to any particular one.

In order to service that growing number of use cases, it is expected that future networks will make use of logical networks termed, "network slices". As used herein, a network slice is a virtual mobile network to which is allocated a set of network resources, providing a particular quality of service.

Each use case may require a different quality of service, and a different configuration of parameters in the network. For example, some use cases may prioritize high download/upload speeds over other quality of service measures, some may prioritize low latency, others may require large coverage. Therefore each network slice may be dedicated to a particular use case, and configured with resources so as to provide a quality of service that is appropriate for that use case. A network slice may be dedicated to a particular service, a particular user, or a particular application, for example.

Although network slices are "virtual" networks, it will be understood by those skilled in the art that the network slices are nonetheless implemented on hardware. For example, network slices may generally be deployed on the same network infrastructure (i.e. the same radio access network, transport network, core network and cloud) but logically isolated from each other.

In order to administer the multiple network slices operative within the network 10, the network 10 may comprise a network slice manager 30. The network slice manager 30 may be implemented by one or more nodes within the core network 20 (as illustrated), or by one or more nodes coupled to the core network 20. Further detail regarding the operation of this network component will be given below.

Thus the devices 26 in the secondary network 22 collect data, and this data needs to be propagated to the consumer devices 28a, 28b. For example, in one embodiment, the secondary network 22 is distributed over a town or city, and the devices 26 have collected data on traffic, road, and weather conditions that would be useful to the buses to help them plan their route or update expected arrival times, etc.

Figure 2:
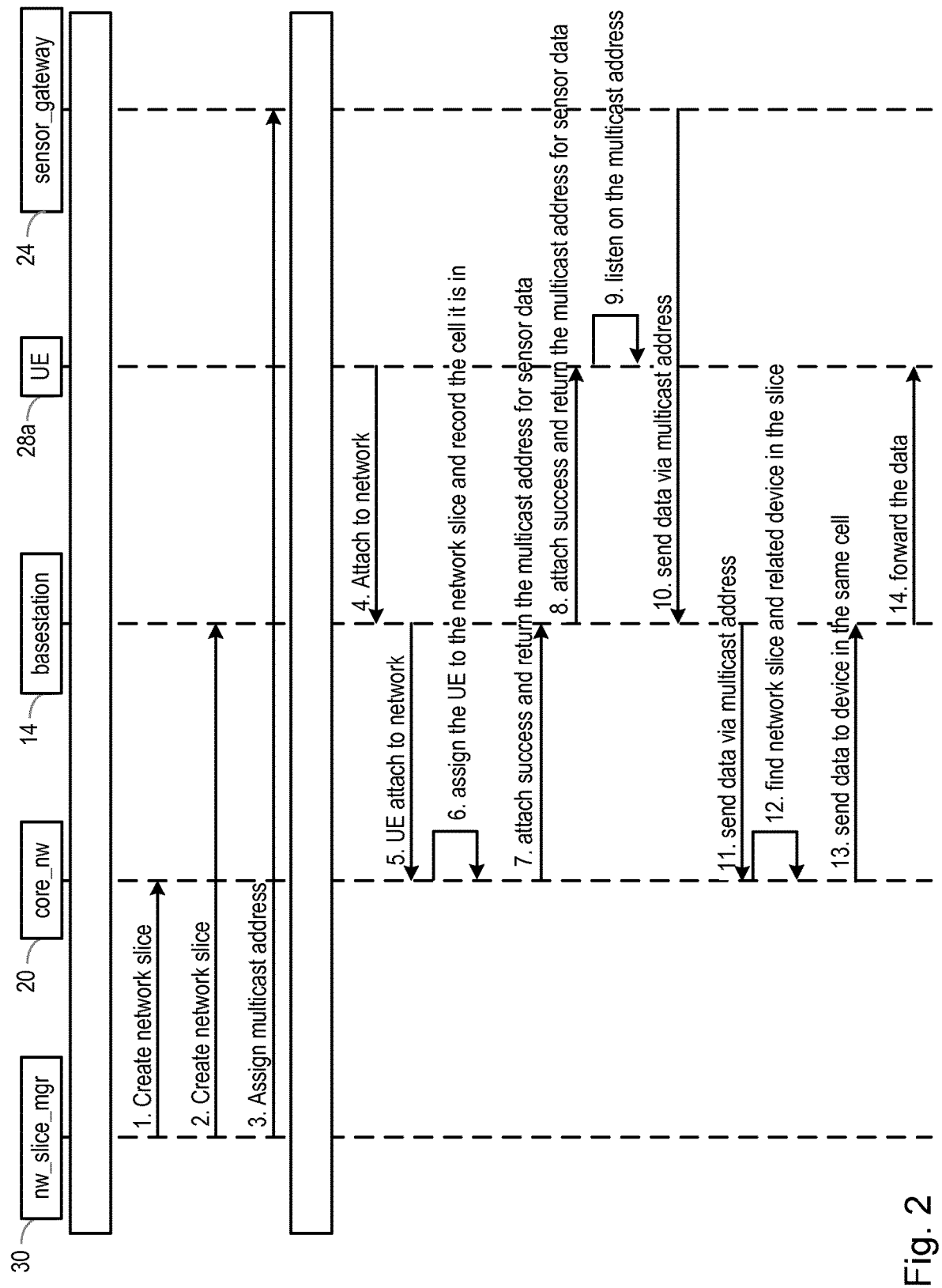
FIG. 2 is a signalling diagram showing the propagation of data over a network according to one embodiment.

FIG. 2 is a signalling diagram showing the propagation of data over a network (e.g. the cellular network 10) according to embodiments of the disclosure. The signalling is divided into three separate processes. Steps 1 to 3 relate to a method of establishing a network slice, as defined above; steps 4 to 9 relate to a method of attaching consumer devices to the network; while steps 10 to 14 relate to the propagation of data to those consumer devices.

In step 1, the network slice manager 30 requests the creation of a network slice at the core network 20. For example, a network slice may be created based on a customer request (such as the bus operator). In this instance, at least one of the purposes of the network slice is to serve the propagation of data from the secondary network to the buses 28a, 28b. The core network 20 may be provided with a list of unique device identifiers for the consumer devices forming the network slice. For example, the device identifiers may comprise international mobile subscriber identities (IMSIs).

In step 2, the network slice manager 30 allocates resources from the radio access network (i.e. base stations 14, 18) for the network slice, in order to provide a given quality of service requested by the customer. The allocation of resources may be static (i.e. permanent, during the lifetime of the network slice) or dynamic (i.e. whereby resources are allocated to the network slice and then de-allocated from the network slice during its lifetime). For example, resources may be allocated by reserving specific portions of the spectrum for the network slice, or reserving or creating a dedicated baseband unit for the network slice. Thus a suitable message may be transmitted by the network slice manager 30 to the base station 14, to reserve resources appropriate for the provision of services to the network slice. Note that the base station 14 in general will also have to provide radio coverage to other devices, whether they belong to other network slices or not.

In step 3, according to some embodiments of the disclosure, the network slice is also allocated a multicast address. The multicast address is then provided to the core network 20 (to enable mapping between the multicast address and the network slice), as well as to other devices which may need to transmit messages to the network slice (such as the gateway device 24). A multicast address is a logical identifier for a group of networked devices and, in some embodiments, may be an internet protocol (IP) address. For example, the multicast address may be associated particularly with the consumer devices 28 (i.e. the buses 28) within the network slice.

In some embodiments of the disclosure, the multicast address is allocated to the network slice by the network slice manager 30 on a 1:1 ratio. That is, the multicast address may be unique to the network slice, with only one multicast address being allocated to each network slice.

Thus at the completion of step 3, the network slice is established within the network. The core network knows the identity of the network slice, and has a list of the consumer devices within the network slice, and knowledge of the resources allocated to the slice (such as the multicast address). Suitable resources have been allocated to the network slice, and other devices within the network (such as the gateway device 24) are aware of the multicast address for the network slice.

In step 4, a consumer device 28a belonging to the network slice (e.g. a bus) attempts to connect to the network. For example, the consumer device 28a may have come within range of the network, or powered up, etc.

In order to connect to the network, the consumer device 28a may transmit one or more attach requests to the radio access node 14 serving the cell 12 within which the consumer device 28a is located. Such attach requests are handled by the radio access node 14 in step 5, which informs the core network 20 that the consumer device 28a wishes to connect to the network. For example, the radio access node 14 may forward a unique identifier for the consumer device 28a (such as its IMSI) to the core network 20 as part of this process.

In step 6, the core network 20 handles the attach request, identifying the network slice(s) that the consumer device 28a belongs to. In the illustrated embodiment, the consumer device 28a belongs to the network slice created in steps 1 to 3, and the core network 20 is able to determine this by comparing the unique identifier for the consumer device to the list of identifiers for the network slice. Of course, although only a single network slice is described herein for simplicity, devices may belong to multiple network slices without departing from the scope of the claims appended hereto.

According to embodiments of the disclosure, the core network 20 may also determine the cell 12 within which the consumer device 28a is located, and keep a record of this information within a database for the network slice. For example, the core network 20 may determine the cell ID based on the identity of the radio access node 14 that transmitted the access requests in step 5. Furthermore, the core network 20 may keep the cell information up to date as consumer devices move around the network. For example, the core network 20 may be informed of consumer device movements by the radio access nodes or the consumer device itself when a consumer device moves from one cell to another.

In step 7, the core network informs the radio access node 14 that the attach request was successful. Additionally, the core network 20 may inform the radio access node 14 of the multicast address for the network slice to which the consumer device 28a belongs. In step 8, this information is relayed by the radio access node 14 to the consumer device 28a.

In step 9, the consumer device 28a is able to listen to the multicast address (as well its own unicast address) for transmissions that are addressed to it. Thus, by the end of step 9, the network slice has been established, and at least one consumer device 28a belonging to the network slice has connected to the network. Of course, in practice, multiple consumer devices may be connected to the network at any one time.

In step 10, the gateway device 24 has collected data that is to be propagated over the network. For example, the gateway device 24 may have collected data from one or more of the devices 26 within the secondary network 22. Alternatively, data may be collected by and propagated from a single device (i.e. that is not part of a secondary network 22).

The gateway device 24 transmits the data to the radio access node 14 in one or more data packets. The data packets may comprise a payload of the data which is to be propagated over the network (e.g. sensor data, etc) and one or more identifiers of wireless devices to which the data is to be sent. For example, the identifiers may comprise one or more unicast addresses for specific devices that are to receive the data. Alternatively, or in addition, the identifiers may comprise one or more multicast addresses. It should be noted that the data may be propagated to multiple devices and/or multiple network slices, so more than one identifier may be provided for each data packet.

IP multicast is a method of sending data packets or datagrams (a basic transfer unit associated with a packet-switched network) to a group of interested receivers in a single transmission over Internet Protocol (IP). It uses especially reserved multicast address blocks in IPv4 and IPv6. For example one IP multicast address can be 224.0.0.1. Using IP Multicast, the gateway device 24 is able to propagate the same data to a large number of receivers by transmitting the data only once. Thus use of multicast addresses may be more efficient as compared to unicast addresses for both the sender and also the network.

In the illustrated embodiment, discussing the use of network slices with dedicated multicast addresses, the data packet comprises at least the multicast address associated with the network slice. In other embodiments, perhaps without dedicated multicast addresses allocated to network slices, the data packets may comprise one or more unicast addresses for particular devices to which the data is to be propagated.

According to embodiments of the disclosure, the data packets may further comprise a propagation indicator, that indicates the cells to which the data is to be propagated.

The propagation indicator can be provided within a field of the data packet header, for example.

In one embodiment, the propagation indicator may contain a list of one or more cell IDs to which the data is to be propagated. In other embodiments, however, the propagation indicator may provide an indication of how widely the data is to be propagated from its source. For example, the propagation indicator may contain one of a plurality of values mapped to certain predefined levels of propagation in the network. For example, with the propagation indicator set to a first value (e.g. 0), data may be propagated only to devices within the same cell as the source of the data. With the propagation indicator set to a second value (e.g. +1), data may be propagated only to devices within the same cell as the source of the data and its neighbouring cells. With the propagation indicator set to a third value (e.g. −1), data may be propagated to devices within any and all cells within the network. Those skilled in the art will appreciate that further values for the propagation indicator and further corresponding levels of granularity may be provided. For example, values may be specified for cells within particular geographical regions, including or not including the cell in which the source of the data is located. The present disclosure is not limited to any particular set of values or corresponding levels of propagation.

In some embodiments the data packets generated and transmitted by the gateway device 24 in step 10 may additionally comprise the cell identity (i.e. the identity of cell 12). For example, the cell identity may be contained within the header of the data packets.

In step 11, the radio access node 14 forwards the data packets to the core network 20, via the same multicast address.

In step 12, the core network 20 determines the network slice based on the multicast address contained within the data packets. The core network 20 further reviews the propagation indicator, determining the one or more cells to which the data is to be propagated, and the devices within the network slice that are located within those one or more cells. The latter step may involve determining the identity of the cell in which the source of the data is located. In embodiments where the cell identity is contained within the data packets transmitted by the gateway device 24, the cell identity can be obtained from the data packets directly. In other embodiments, the cell identity may be determined based on the identity of the radio access node 14 that received the data packets in step 10, and forwarded those packets in step 11.

For example, if the propagation indicator indicates that the data is to be propagated only to devices within the same cell as the source of the data (e.g. cell 12), the core network 20 may determine the consumer devices belonging to the network slice that are within the same cell 12 as the gateway device 24 (e.g. consumer device 28*a*).

If the propagation indicator indicates that the data is to be propagated only to devices within the same cell as the source of the data and its neighbouring cells, the core network 20 may first determine which cells neighbour the cell in which the source of the data is located. For example, the core network 20 may comprise a database listing the cells of the network and their geographical locations. By consulting this database, the core network 20 may be able to determine which cells neighbour the cell in which the gateway device 24 is located (e.g. cells 12 and 16). The core network 20 can then determine the consumer devices (e.g. consumer devices 28*a* and 28*b*) located within those cells.

If the propagation indicator indicates that the data is to be propagated to devices within any and all cells of the network, the core network 20 may determine the locations of all devices within the network slice.

In the illustrated embodiment, the propagation indicator is set to the first value, meaning that the data should be propagated only to devices within the same cell as the source of the data. Therefore consumer device 28*a* is identified and, in step 13, the data is transmitted by the core network 20 to the radio access node 14 for the cell 12 in question. In step 14, the radio access node 14 transmits the data to the consumer device 28*a* using the multicast address to which the device is listening (cf step 9 above).

Figure 3:
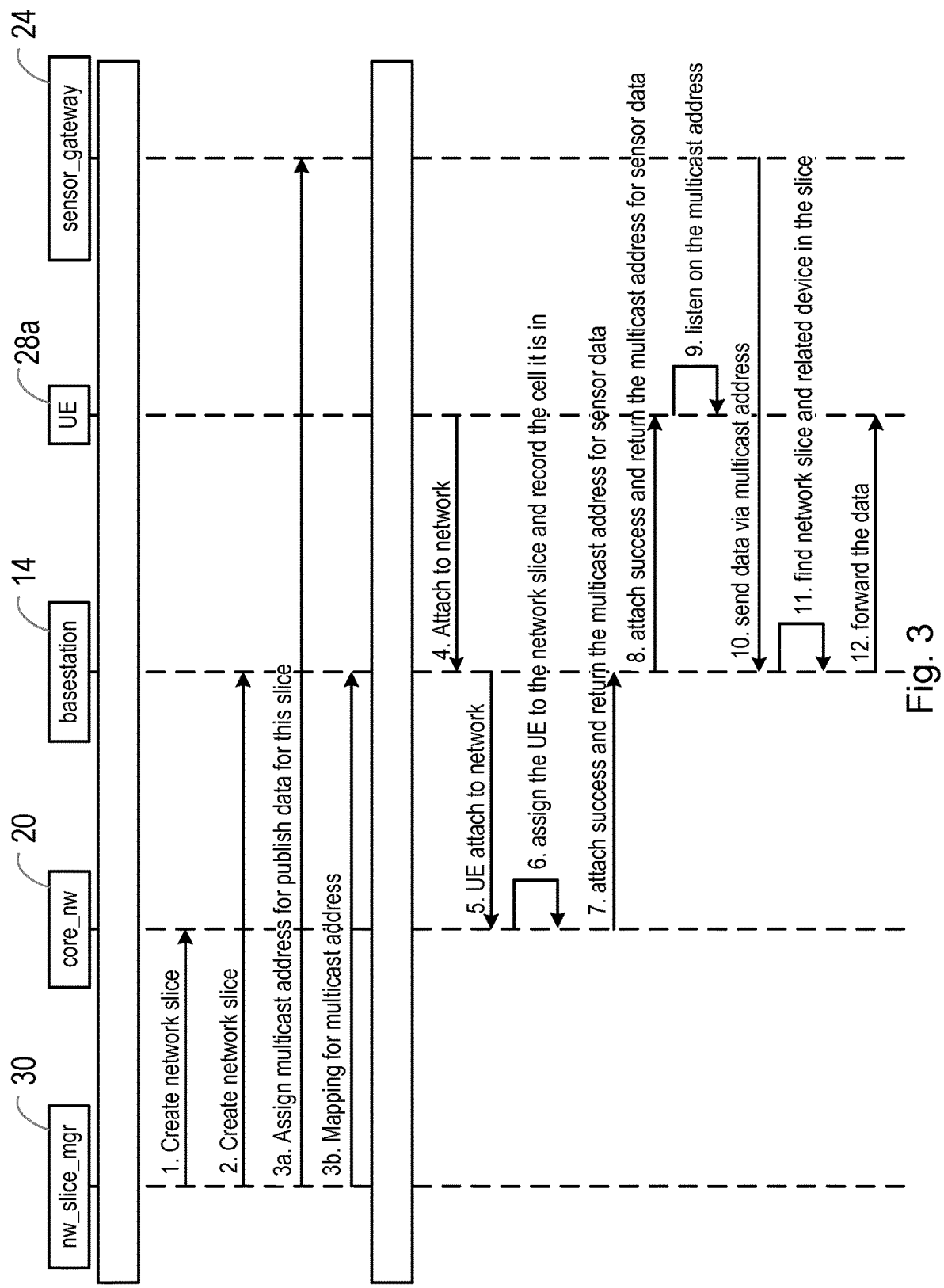
FIG. 3 is a signalling diagram showing the propagation of data over a network according to a further embodiment.

FIG. 2 is a signalling diagram showing the processing of data packets by the core network 20. However, in other embodiments of the disclosure, some or all of the processing of data packets can be carried out in the radio access network. FIG. 3 is a signalling diagram showing the propagation of data over a network according to one such embodiment.

Many of the signalling steps in FIG. 3 are common to those in FIG. 2, and will not described in great detail. For example, steps 1 and 2 are similar to those described above, while step 3*a* is similar to step 3 described above.

However, if the radio access node 14 is to determine the devices to which the data is to be propagated (e.g. the devices belonging to the network slice associated with the multicast address), the radio access node 14 must have some knowledge of the mapping between devices and multicast address. Thus FIG. 3 comprises an additional step 3*b*, in which the network slice manager 30 informs the radio access node 14 of the mapping for the multicast address associated with the network slice (e.g. the multicast address and the corresponding list of devices identifying with that multicast address).

Steps 4 to 9 relate to the consumer deice 28*a* connecting to the network, and are similar to their corresponding steps described above with respect to FIG. 2.

Steps 10 to 12 relate to the propagation of data over the network. Although step 10 is similar to step 10 described with respect to FIG. 2, the methods depart at step 11. In the embodiment of FIG. 3, the radio access node 14 determines the network slice based on the multicast address contained within the data packets. The radio access node 14 further reviews the propagation indicator, determining the one or more cells to which the data is to be propagated, and the devices within the network slice that are located within those one or more cells.

For example, if the propagation indicator indicates that the data is to be propagated only to devices within the same cell as the source of the data (e.g. cell 12), the radio access node 14 may immediately transmit the data to those devices in step 12 using the same multicast address.

If the propagation indicator indicates that the data is to be propagated only to devices within the same cell as the source of the data and its neighbouring cells, the radio access node 14 may transmit one or more messages to its neighbouring radio access nodes (e.g. the radio access node 18) with an instruction that those neighbouring radio access nodes transmit the data to devices associated with the multicast address in their own cells. Such messages may be transmitted via the core network 20, or via a direct interface between the two radio access nodes 14, 18 (e.g. the X2 interface). The radio access node 14 additionally transmits the data to those devices in its own cell.

If the propagation indicator indicates that the data is to be propagated to devices within any and all cells of the network, the radio access node 14 may forward the data to the core network 20 for further handling as described above with respect to FIG. 2.

Thus in this embodiment, latency in the propagation of data may be reduced through the processing of data packets in the radio access network where possible, e.g. where the propagation indicator indicates that data should be propagated only to the cell in which the source of the data is located and/or neighbouring cells. This will also reduce traffic on the core network.

Figure 4:
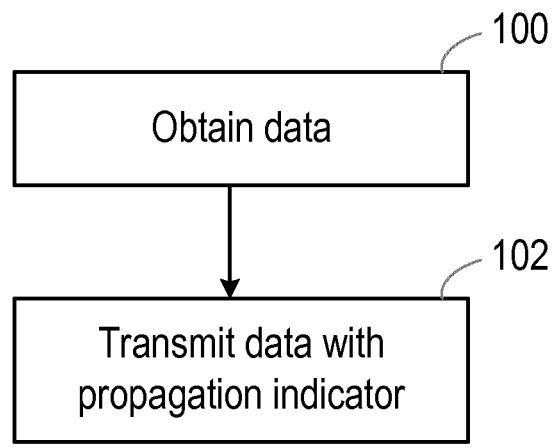
FIG. 4 is a flowchart of a method in a wireless device.

FIG. 4 is a flowchart of a method in a wireless device. The wireless device may belong to a secondary network (e.g. a capillary network), such as the network 22 described above. For example, the wireless device may be the gateway device 24 described above. In alternative embodiments, however, the wireless device may not be connected to or associated with a secondary network of devices.

In step 100, the wireless device obtains data that is to be propagated over a wireless cellular network. For example, the wireless device may have collected data from one or more devices within a secondary network (such as sensors, etc). Alternatively, the wireless device may have collected its own data and need to propagate that data over the cellular network.

In step 102, the wireless device transmits the data to a radio access node 14 in one or more data packets. The data packets may comprise a payload of the data which is to be propagated over the network (e.g. sensor data, etc) and one or more identifiers of wireless devices to which the data is to be sent.

For example, the identifiers may comprise one or more unicast addresses for specific devices that are to receive the data. Alternatively, or in addition, the identifiers may comprise one or more multicast addresses. One or more of the multicast addresses may be associated with corresponding network slices within the cellular network. However, multicast addresses can be used more generally to send data packets to a group of networked devices, and the disclosure is not limited to embodiments in which those devices belong to the same network slice. It should be noted that the data may be propagated to multiple devices and/or multiple network slices, so more than one identifier may be provided for each data packet.

The data packets may additionally comprise the identity of the cell in which the wireless device is located (i.e. the identity of cell 12).

According to embodiments of the disclosure, the data packets may further comprise a propagation indicator, that indicates the cells to which the data is to be propagated. The propagation indicator can be provided within a field of the data packet header, for example.

In one embodiment, the propagation indicator may contain a list of one or more cell IDs to which the data is to be propagated. In other embodiments, however, the propagation indicator may provide an indication of how widely the data is to be propagated from its source. For example, the propagation indicator may contain one of a plurality of values mapped to certain predefined levels of propagation in the network. For example, with the propagation indicator set to a first value (e.g. 0), data may be propagated only to devices within the same cell as the source of the data. With the propagation indicator set to a second value (e.g. +1), data may be propagated only to devices within the same cell as the source of the data and its neighbouring cells. With the propagation indicator set to a third value (e.g. −1), data may be propagated to devices within any and all cells within the network. Those skilled in the art will appreciate that further values for the propagation indicator and further corresponding levels of granularity may be provided. For example, values may be specified for cells within particular geographical regions, including or not including the cell in which the source of the data is located. The present disclosure is not limited to any particular set of values or corresponding levels of propagation.

Figure 5:
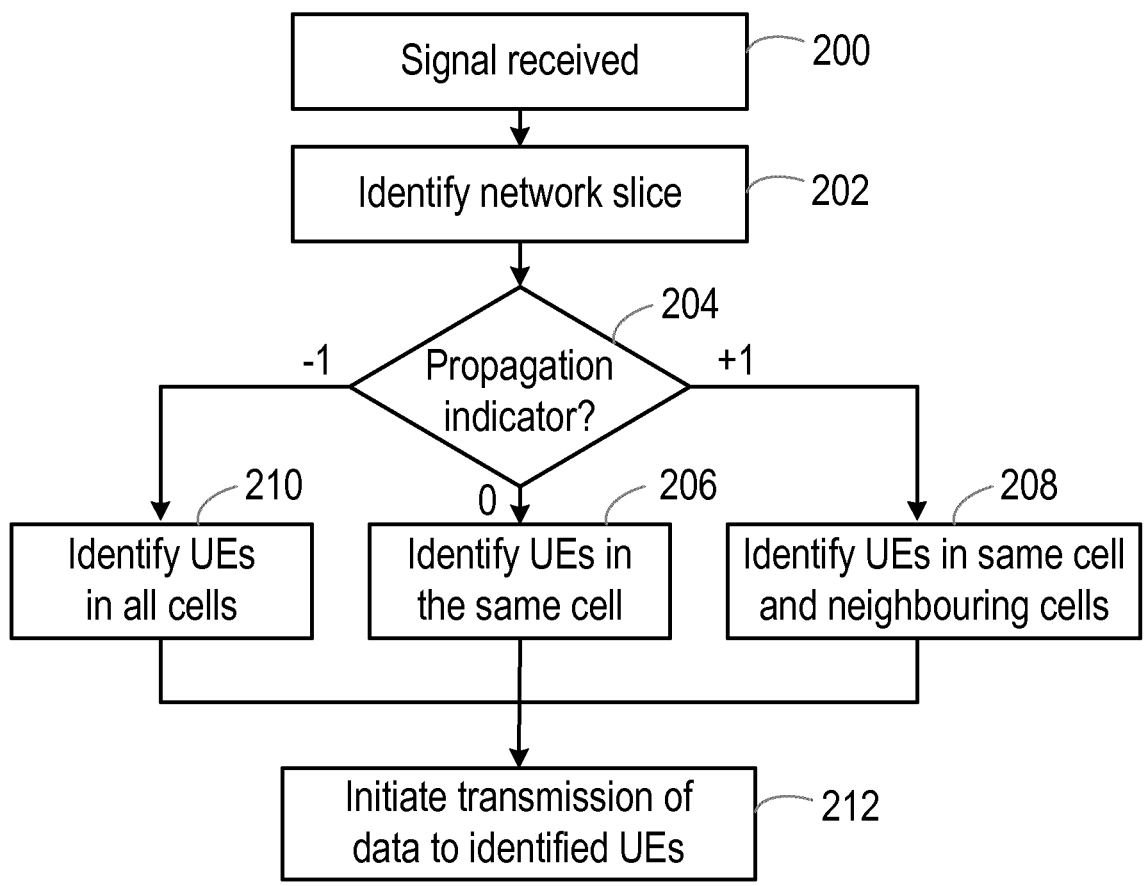
FIG. 5 is a flowchart of a method in a network node.

FIG. 5 is a flowchart of a method in a network node of a wireless cellular network. The network node may be suitable for carrying out the signalling and processing associated with the core network 20 (e.g. as set out with respect to FIG. 2), or with the radio access node 14 (e.g. as set out with respect to FIG. 3). Thus the network node may be located in the core network or the radio access network.

In step 200, the network node receives a signal containing data to be propagated over the cellular network. If the network node is a core network node, this signal may have been forwarded by a radio access node. If the network node is a radio access node, the signal may have been received directly from the source of the data. The signal may comprise one or more data packets comprising a payload of the data which is to be propagated over the network (e.g. sensor data, etc) and one or more identifiers of wireless devices to which the data is to be sent. The data packets additionally comprise a propagation indicator and may comprise the identity of the cell in which the source of the data is located.

The identifiers may comprise one or more unicast addresses for specific devices that are to receive the data. Alternatively, or in addition, the identifiers may comprise one or more multicast addresses. One or more of the multicast addresses may be associated with corresponding network slices within the cellular network. However, multicast addresses can be used more generally to send data packets to a group of networked devices, and the disclosure is not limited to embodiments in which those devices belong to the same network slice. It should be noted that the data may be propagated to multiple devices and/or multiple network slices, so more than one identifier may be provided for each data packet.

In step 202, the network node identifies the network slices (if any) associated with the identifiers contained within the data packets. For example, the network node may comprise, or have access to, a database listing network slices and their corresponding multicast addresses. Such a database can be generated and maintained by a network slice manager as network slices are formed at the request of users.

In embodiments without network slices, this step may be omitted.

In step 204, the network node determines the cells to which the data is to be propagated, based on the propagation indicator contained within the data packets.

In one embodiment, the propagation indicator may contain a list of one or more cell IDs to which the data is to be propagated. In other embodiments, however, the propagation indicator may provide an indication of how widely the data is to be propagated from its source. For example, the propagation indicator may contain one of a plurality of values mapped to certain predefined levels of propagation in the network.

For example, with the propagation indicator set to a first value (e.g. 0), data may be propagated only to devices within the same cell as the source of the data. With the propagation indicator set to a second value (e.g. +1), data may be propagated only to devices within the same cell as the source of the data and its neighbouring cells. With the propagation indicator set to a third value (e.g. −1), data may be propagated to devices within any and all cells within the network. Those skilled in the art will appreciate that further values for the propagation indicator and further corresponding levels of granularity may be provided. For example, values may be specified for cells within particular geographical regions, including or not including the cell in which the source of the data is located. The present disclosure is not limited to any particular set of values or corresponding levels of propagation.

Continuing this example, however, if the value of the propagation indicator is 0, the method proceeds to step 206, in which the network node identifies the wireless devices associated with the network slice (or otherwise associated with the identifiers contained within the data packets) which are within the same cell as the source of the data. The method can then proceed to step 212 in which transmission of the data to those identified devices is initiated. For example, if the network node is a core network node, step 212 may comprise transmitting a message to a radio access node associated with that cell, with instructions to transmit the data to the devices identified in step 206 (e.g. using the multicast address contained within the data packets). If the network node is a radio access node, step 212 may comprise transmitting the data to the devices identified in step 206 directly (e.g. using the multicast address contained within the data packets).

If it is determined in step 204 that the value of the propagation indicator is +1, the method proceeds to step 208, in which the network node identifies the wireless devices associated with the network slice (or otherwise associated with the identifiers contained within the data packets) which are within the same cell as the source of the data, and within cells that neighbour that cell.

The method can again proceed to step 212 in which transmission of the data to those identified devices is initiated. For example, if the network node is a core network node, step 212 may comprise transmitting messages to the radio access nodes associated with those cells, with instructions to transmit the data to the devices identified in step 208 (e.g. using the multicast address contained within the data packets). If the network node is a radio access node, step 212 may comprise transmitting the data to the devices identified in step 208 directly (e.g. using the multicast address contained within the data packets), and transmitting messages (e.g. over a direct interface, or via the core network) to one or more neighbouring radio access nodes with instructions to transmit the data to the devices in their respective cells identified in step 208.

If it is determined in step 204 that the value of the propagation indicator is −1, the method proceeds to step 210, in which the network node identifies the wireless devices associated with the network slice (or otherwise associated with the identifiers contained within the data packets) which are in any and all cells of the cellular network. If carried out in a core network node, this step may comprise consulting a database containing the current cells of each device within the network slice. If carried out in a radio access node, this step may comprise transmitting one or more request messages to the core network for access to that database. Alternatively, the radio access node may simply forward the data packets to the core network at this point for further processing.

Once the devices are identified, the method can proceed to step 212 in which transmission of the data to those identified devices is initiated. For example, if the network node is a core network node, step 212 may comprise transmitting messages to the radio access nodes associated with cells in which the identified devices are located, with instructions to transmit the data to those devices (e.g. using the multicast address contained within the data packets).

Figure 6:
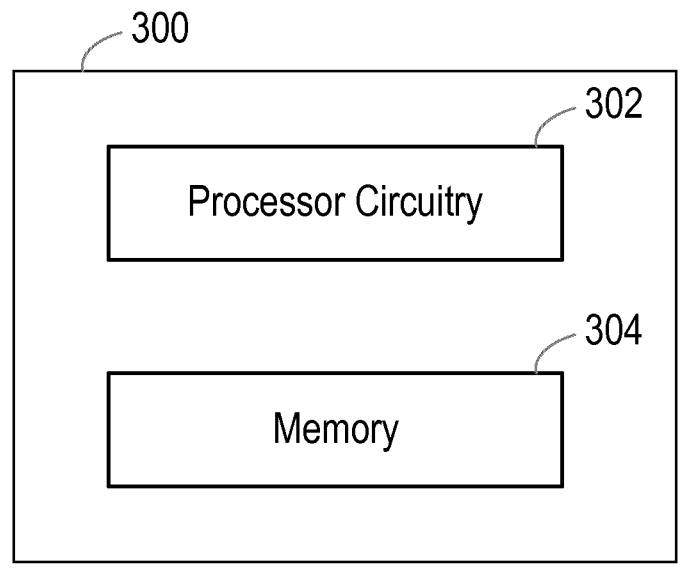
FIG. 6 is a schematic diagram of a network node.

FIG. 6 is a schematic diagram of a network node 300 in accordance with embodiments of the disclosure. The network node 300 may be suitable for carrying out the method described above with respect to FIG. 5, for example, and may be a node in the core network 20 (e.g. as set out with respect to FIG. 2), or a radio access node (e.g. as set out with respect to FIG. 3).

The network node 300 comprises processor circuitry 302 and a computer readable medium 304 (such as memory). The computer-readable medium 304 is coupled to the processor circuitry 302 and stores code which, when executed by the processor circuitry 302, causes the network node 300 to: responsive to receipt of a wireless communications signal transmitted by a first wireless device, the wireless communications signal comprising data to be propagated by the wireless cellular network, a propagation indicator, for indicating one or more cells of the wireless cellular network, and an identifier for identifying one or more wireless devices to which the data is to be propagated, determine which of the one or more identified wireless devices is served by the one or more cells; and initiate propagation of the data to one or more determined identified wireless devices.

In some embodiments, the network node 300 may also comprise one or more interfaces (not illustrated) over which packets can be transmitted. For example, the network node 300 may comprise wired or wireless transceiver circuitry.

Figure 7:
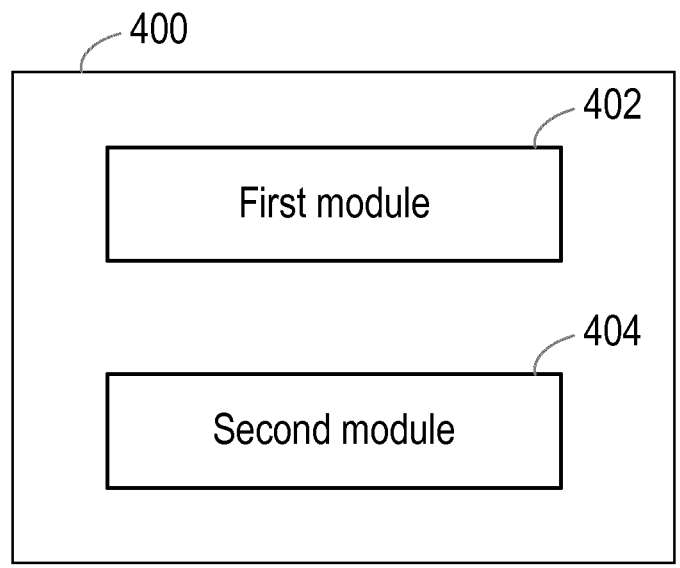
FIG. 7 is a schematic diagram of another network node.

FIG. 7 is a schematic diagram of a network node 400 according to further embodiments of the disclosure. The network node 400 may be suitable for carrying out the method described above with respect to FIG. 5, for example, and may be a node in the core network 20 (e.g. as set out with respect to FIG. 2), or a radio access node (e.g. as set out with respect to FIG. 3).

The network node 400 comprises a first module 402 configured to, responsive to receipt of a wireless communications signal transmitted by a first wireless device, the wireless communications signal comprising data to be propagated by the wireless cellular network, a propagation indicator, for indicating one or more cells of the wireless cellular network, and an identifier for identifying one or more wireless devices to which the data is to be propagated, determine which of the one or more identified wireless devices is served by the one or more cells. The network node 400 comprises a second module 404 configured to initiate propagation of the data to one or more determined identified wireless devices.

The network node 400 may further comprise one or more interface modules (not illustrated) for communicating with other nodes of the network. For example, the node 400 may comprise a transceiver module for transmitting and receiving wireless signals. The node 400 may comprise a wired interface module, for transmitting and receiving signals over a wire.

Figure 8:
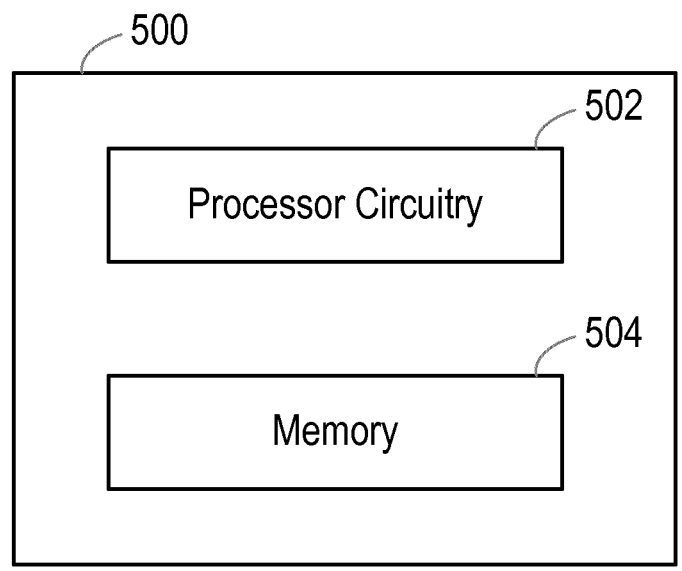
FIG. 8 is a schematic diagram of a wireless device.

FIG. 8 is a schematic diagram of a wireless device 500 in accordance with embodiments of the disclosure. The wireless device 500 may be suitable for carrying out the method described above with respect to FIG. 4, for example, and/or the signalling associated with the gateway device 24 shown in FIGS. 2 and 3.

The wireless device 500 may be suitable for operation within and communication with a wireless cellular network. The wireless device 500 comprises processor circuitry 502 and a computer readable medium 504 (such as memory).

The computer-readable medium 504 is coupled to the processor circuitry 502 and stores code which, when executed by the processor circuitry 502, causes the wireless device 500 to: obtain data to be propagated over the wireless cellular network; and transmit, to a radio network node serving a first cell in which the wireless device is located, a wireless communication signal. The wireless communication signal comprises: the data to be propagated by the wireless cellular network; a propagation indicator, for indicating one or more cells of the wireless cellular network; and an identifier for identifying one or more wireless devices to which the data is to be propagated, responsive to a determination that a wireless device of the one or more identified wireless devices is served by one of the one or more cells.

In some embodiments, the wireless device 500 may also comprise one or more interfaces (not illustrated) over which wireless signals can be transmitted. For example, the wireless device 500 may comprise wired or wireless transceiver circuitry.

Figure 9:
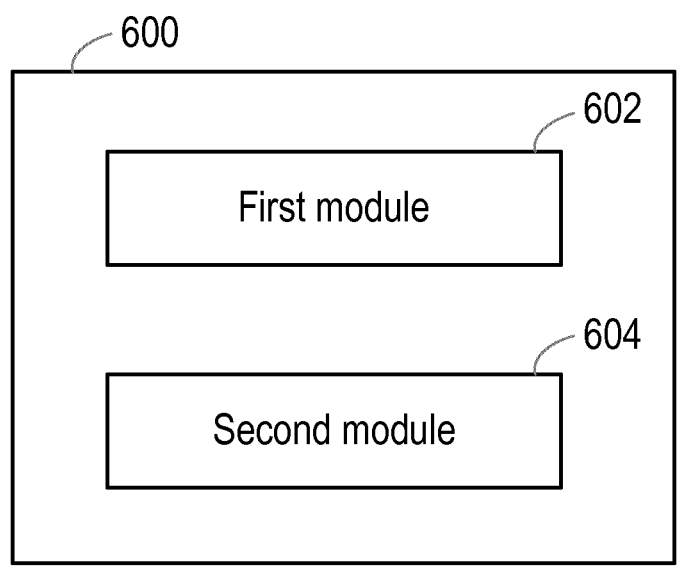
FIG. 9 is a schematic diagram of another wireless device.

FIG. 9 is a schematic diagram of a wireless device 600 according to further embodiments of the disclosure. The wireless device 600 may be suitable for carrying out the method described above with respect to FIG. 4, for example, and/or the signalling associated with the gateway device 24 shown in FIGS. 2 and 3.

The wireless device 600 may be suitable for operation within and communication with a wireless cellular network. The wireless device 600 comprises a first module 602 configured to obtain data to be propagated over the wireless cellular network. The wireless device 600 further comprises a second module 604 configured to transmit, to a radio network node serving a first cell in which the wireless device is located, a wireless communication signal. The wireless communication signal comprises: the data to be propagated by the wireless cellular network; a propagation indicator, for indicating one or more cells of the wireless cellular network; and an identifier for identifying one or more wireless devices to which the data is to be propagated, responsive to a determination that a wireless device of the one or more identified wireless devices is served by one of the one or more cells.

The wireless device 600 may further comprise one or more interface modules (not illustrated) for communicating with other nodes of the network. For example, the wireless device 600 may comprise a transceiver module for transmitting and receiving wireless signals. The wireless device 600 may comprise a wired interface module, for transmitting and receiving signals over a wire.

Embodiments of the disclosure thus provide efficient mechanisms for the propagation of data over a network. The data packets are transmitted with identifiers (e.g. multicast addresses) for devices or groups of devices which are to receive the data. The data packets are further transmitted with propagation indicators, indicating the cells over which the data is to be propagated (or how widely the data is to be propagated from its source). Thus only those consumer devices which are both addressed by the data packets in question and within the cells identified by the propagation indicator will receive the data. Devices which are addressed by the data packets (e.g. are within the addressed network slice) but not within the identified cells do not receive the data. Similarly, devices which are within the identified cells but not addressed by the data packets do not receive the data. Accordingly network usage is reduced as only those devices for which the data is relevant will receive it (potentially only in a localized part of the network). Moreover, there is no requirement for those devices to fetch the data from a remote server, so latency can be reduced.

The invention claimed is:

1. A method in a first wireless device of a wireless cellular network, the wireless cellular network comprising a plurality of cells, each cell served by a radio network node, the method comprising:
   obtaining data to be propagated over the wireless cellular network; and
   transmitting, to a radio network node serving a first cell in which the first wireless device is located, a wireless communication signal, the wireless communication signal comprising:
   the data to be propagated;
   a destination address for identifying a set of one or more wireless devices, the set of one or more wireless devices comprising a second wireless device, wherein the destination address is i) a unicast address for identifying the second wireless device or ii) a multicast address for identifying a group of wireless devices to which the second wireless device belongs; and
   a propagation indicator, separate from the destination address, specifying a set of one or more cells of the wireless cellular network in which the data may be propagated.

2. The method of claim 1, wherein the propagation indicator indicates that:
   the data may not be propagated in any cell other than the first cell;
   the data may not be propagated in any cell other than the first cell or any cell neighboring the first cell or
   the data may be propagated in any cell of the wireless cellular network.

3. The method of claim 1, wherein the first wireless device is further configured to communicate with a secondary wireless network, and wherein the step of obtaining data comprises:
   obtaining data from one or more devices of the secondary wireless network.

4. The method of claim 3, wherein the one or more devices on the secondary wireless network comprise a plurality of sensors, and the data to be propagated comprises sensor data.

5. The method of claim 1, wherein the destination address is the multicast address.

6. The method of claim 5, wherein
   each wireless device included in the set of one or more wireless devices is registered with a virtual network established with the cellular wireless network, and
   the multicast address identifies the virtual network, thereby identifying the set of wireless devices.

7. The method of claim 1, wherein
   the propagation indicator indicates that the data may not be propagated in any cell other than the first cell, and
   the destination address is the multicast address.

8. The method of claim 1, wherein
   the propagation indicator indicates that the data may not be propagated in any cell other than the first cell or any cell neighboring the first cell, and
   the destination address is the multicast address.

9. A first wireless device for a wireless cellular network, the first wireless device comprising:
   processor circuitry; and
   a computer-readable medium coupled to the processor circuitry and storing code which, when executed by the processor circuitry, causes the first wireless device to:

obtain data to be propagated over the wireless cellular network; and transmit, to a radio network node serving a first cell in which the first wireless device is located, a wireless communication signal, the wireless communication signal comprising:

the data to be propagated;

a destination address for identifying a set of one or more wireless devices, the set of one or more wireless devices comprising a second wireless device, wherein the destination address is i) a unicast address for identifying the second wireless device or ii) a multicast address for identifying a group of wireless devices to which the second wireless device belongs; and a propagation indicator, separate from the destination address, specifying a set of one or more cells of the wireless cellular network in which the data may be propagated.

10. The first wireless device of claim 9, wherein the propagation indicator takes one of a plurality of values, the plurality of values comprising respective values for specifying that the data is to be propagated to one or more identified wireless devices in:

only the first cell;

only the first cell and one or more second cells that neighbour the first cell; and any cell of the wireless cellular network.

11. The first wireless device of claim 9, wherein the one or more wireless devices comprise a plurality of sensors, and the data to be propagated comprises sensor data.

12. The first wireless device of claim 9, wherein the identifier comprises a multicast address.

13. The first wireless device of claim 9, wherein the identifier is associated with a virtual network established within the cellular wireless network, and wherein the one or more wireless devices to which the data is to be propagated are registered with the virtual network.

14. A method in a network node of a cellular wireless network, the method comprising:

receiving a wireless communications signal transmitted by a first wireless device, the wireless communications signal comprising:

data to be propagated, a destination address for identifying a set of one or more wireless devices, the set of one or more wireless devices comprising a second wireless device, wherein the destination address is i) a unicast address for identifying the second wireless device or ii) a multicast address for identifying a group of wireless devices to which the second wireless device belongs, and a propagation indicator, separate from the destination address, for specifying one or more cells of the wireless cellular network in which the data may be propagated;

after receiving the wireless communication signal, determining that the second wireless device is served by a cell indicated by the propagation indicator; and as a result of determining that the second wireless device is served by a cell indicated by the propagation indicator, initiating propagation of the data to the second wireless device.

15. The method of claim 14, wherein the propagation indicator takes one of a plurality of values, the plurality of values comprising respective values for specifying that the data is to be propagated to one or more identified wireless devices in:

only the first cell;

only the first cell and one or more second cells that neighbour the first cell; and any cell of the wireless cellular network.

16. The method of claim 14, wherein the identifier comprises a multicast address and the method further comprises determining the one or more wireless devices associated with the multicast address.

17. The method of claim 14, wherein the identifier is associated with a virtual network established within the cellular wireless network, and wherein the one or more wireless devices to which the data is to be propagated are registered with the virtual network.

18. The method of claim 14, further comprising:

receiving a notification message from a radio access network of the wireless cellular network, the notification message indicating that the radio access network received the wireless communications signal transmitted by the first wireless device, the notification message comprising the data to be propagated, the propagation indicator and the identifier; and wherein the step of propagating the data comprises transmitting one or more instruction signals to the radio access network in accordance with the propagation indicator, the one or more instruction signals comprising the data and instructing the radio access network to transmit the data to the one or more determined identified wireless devices.

19. The method of claim 14, wherein the network node is a radio access node and the method further comprises receiving the wireless communication signal from the first wireless device.

20. The method of claim 19, wherein the step of propagating the data comprises one or more of:

transmitting one or more wireless signals containing the data to the one or more determined identified wireless devices in the first cell; and transmitting one or more wireless signals containing the data to one or more radio access nodes serving neighbouring cells in which the one or more determined identified wireless devices are located.

21. A network node for a wireless cellular network, the network node comprising:

processor circuitry; and a computer-readable medium coupled to the processor circuitry and storing code which, when executed by the processor circuitry, causes the network node to:

process a received wireless communications signal transmitted by a first wireless device, the wireless communications signal comprising:

data to be propagated, a destination address for identifying a set of one or more wireless devices, the set of one or more wireless devices comprising a second wireless device, wherein the destination address is i) a unicast address for identifying the second wireless device or ii) a multicast address for identifying a group of wireless devices to which the second wireless device belongs, and a propagation indicator, separate from the destination address, for specifying one or more cells of the wireless cellular network in which the data may be propagated;

determining that the second wireless device is served by a cell indicated by the propagation indicator; and as a result of determining that the second wireless device is served by a cell indicated by the propagation indicator, initiating propagation of the data to the second wireless device.

22. The network node of claim 21, wherein the propagation indicator takes one of a plurality of values, the plurality of values comprising respective values for specifying that the data is to be propagated to one or more identified wireless devices in:

only the first cell;

only the first cell and one or more second cells that neighbour the first cell; and any cell of the wireless cellular network.

* * * * *